(12) United States Patent
Teboulle

(10) Patent No.: US 12,282,347 B2
(45) Date of Patent: Apr. 22, 2025

(54) FLAMMABLE FLUID METER ARRANGED TO DETECT A TEMPERATURE ANOMALY

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 232 days.

(21) Appl. No.: 17/185,527

(22) Filed: Feb. 25, 2021

(65) Prior Publication Data
US 2021/0263539 A1 Aug. 26, 2021

(30) Foreign Application Priority Data

Feb. 25, 2020 (FR) ...................................... 20 01827

(51) Int. Cl.
| | |
|---|---|
| *G05D 7/06* | (2006.01) |
| *G01K 3/00* | (2006.01) |
| *G01K 13/02* | (2021.01) |
| *G05B 15/02* | (2006.01) |

(52) U.S. Cl.
CPC ........... *G05D 7/0623* (2013.01); *G01K 3/005* (2013.01); *G01K 13/026* (2021.01); *G05B 15/02* (2013.01); *G05D 7/0635* (2013.01)

(58) Field of Classification Search
CPC .... G05D 7/0623; G05D 7/0635; G05B 15/02; G01K 3/005; G01K 13/026; G01K 1/024; G01K 13/02; G01F 1/66; G01F 15/005; G01F 15/063; G08B 25/007; G08B 21/16; F16K 17/38; F16K 37/005; H04B 5/0037; H04L 63/0435
See application file for complete search history.

(56) References Cited

U.S. PATENT DOCUMENTS 5,077,730 A * 12/1991 Arrowood ................. H04L 9/40
370/228
2006/0076053 A1 * 4/2006 McGill ................. F16K 3/0209
137/39

(Continued)

FOREIGN PATENT DOCUMENTS

| | | |
|---|---|---|
| CN | 2189310 Y | 2/1995 |
| JP | 2008-202815 A | 9/2008 |

*Primary Examiner* — Christopher W Carter
(74) *Attorney, Agent, or Firm* — MUNCY, GEISSLER, OLDS & LOWE, P.C.

(57) ABSTRACT

A flammable fluid meter includes a first communication interface arranged to communicate with a second communication interface of a cut-off unit including an electromechanical valve; a temperature sensor arranged to measure the temperature of the flammable fluid; a processor module arranged to acquire temperature measurements produced by the temperature sensor, to attempt to detect the occurrence of an anomaly, and if an anomaly is detected, to produce an internal control frame incorporating a closing command for closing the electromechanical valve and to transmit said internal control frame to the second communication interface of the cut-off unit via the first communication interface in order to close the electromechanical valve.

14 Claims, 4 Drawing Sheets

(56) References Cited

U.S. PATENT DOCUMENTS

| | | | |
|---|---|---|---|
| 2007/0089695 A1* | 4/2007 | Stretch | F01L 9/10 123/90.15 |
| 2010/0180954 A1* | 7/2010 | Hagler | F16K 27/07 251/14 |
| 2011/0066297 A1* | 3/2011 | Saberi | H04Q 9/00 700/287 |
| 2011/0284777 A1* | 11/2011 | Pitchford | F16K 31/06 251/65 |
| 2013/0098469 A1 | 4/2013 | Deegan et al. | |
| 2013/0153798 A1* | 6/2013 | Kucera | F16K 37/0083 251/129.01 |
| 2014/0110613 A1* | 4/2014 | Pitchford | F16K 31/082 251/129.01 |
| 2015/0326390 A1* | 11/2015 | Kim | H04L 9/0863 380/44 |
| 2017/0254685 A1 | 9/2017 | Wilt et al. | |
| 2018/0136673 A1* | 5/2018 | Halimi | G05D 7/0635 |

* cited by examiner

FLAMMABLE FLUID METER ARRANGED TO DETECT A TEMPERATURE ANOMALY

The invention relates to the field of meters for flammable fluid, e.g. natural gas.

BACKGROUND OF THE INVENTION

A gas distribution network comprises pipes connected to gas-consuming installations via gas meters.

It is known to mount a cut-off unit on a pipe in the proximity of a gas meter, generally upstream from the gas meter (i.e. on its distribution network side and not on its installation side), but possibly downstream from the gas meter.

Such a cut-off unit conventionally includes an electromechanical valve that is controlled for the purpose of selectively cutting off or re-establishing the supply of gas to the installation. The electromechanical valve may be activated to cut off the supply, e.g. when a gas leak is detected, or else when a dwelling is expected to remain empty for a certain length of time, e.g. after a move.

The operator of a gas distribution network must clearly take substantial measures to ensure that distribution is safe. Specifically, gas distribution presents a certain number of well-known risks, the consequences of which can be catastrophic: fire, explosion, poisoning, etc.

OBJECT OF THE INVENTION

An object of the invention is to improve the safety of a network for distributing a flammable fluid.

SUMMARY OF THE INVENTION

In order to achieve this object, there is provided a flammable fluid meter comprising:
- a first communication interface arranged both to communicate via a radio link with a second communication interface of a cut-off unit including an electromechanical valve, and also to transmit electrical energy via the radio link, the electrical energy being adapted to power the second communication interface of the cut-off unit;
- a temperature sensor arranged to measure the temperature of the flammable fluid;
- a processor module arranged to acquire temperature measurements produced by the temperature sensor in order to attempt to detect the occurrence of an anomaly relating to the temperature of the flammable fluid, and if an anomaly relating to the temperature of the flammable fluid is detected, in order to produce an internal control frame incorporating a closing command for closing the electromechanical valve and to transmit said internal control frame to the second communication interface of the cut-off unit via the first communication interface in order to close the electromechanical valve.

The flammable fluid meter of the invention can thus detect the occurrence of an anomaly relating to the temperature of the flammable fluid, and, where necessary, it can act on the electro-mechanical valve of the cut-off unit in order to interrupt the distribution of the flammable fluid. This serves to reduce significantly any risk of a fire or an explosion occurring. The flammable fluid meter is situated in the proximity of the cut-off unit and it decides in independent manner whether or not it is necessary to close the electromechanical valve, thereby enabling distribution to be cut off very quickly in the event of an anomaly associated with temperature.

There is also provided a flammable fluid meter as described above, wherein the processor module is arranged to detect the occurrence of an anomaly relating to the temperature of the flammable fluid when the temperature of the flammable fluid is greater than a predetermined temperature threshold, or when a variation in the temperature of the flammable fluid is greater than a predetermined variation threshold.

There is also provided a flammable fluid meter as described above, wherein, following detection of an anomaly relating to the temperature of the flammable fluid and following closure of the electromechanical valve, the processor module is arranged to act via the first communication interface to acquire an external control frame incorporating an opening command and potentially transmitted by a mobile device brought into the proximity of the flammable fluid meter, and to produce an internal control frame incorporating the opening command and to transmit said internal control frame to the second communication interface of the cut-off unit via the first communication interface in order to re-open the electromechanical valve.

There is also provided a flammable fluid meter as described above, wherein the processor module is arranged to verify that the temperature of the flammable fluid has returned to normal before re-opening the electromechanical valve.

There is also provided a flammable fluid meter as described above, wherein, after re-opening of the electromechanical valve, the processor module is arranged also to verify that the quantity of flammable fluid distributed during a predetermined duration is less than or equal to a predetermined quantity threshold, and to re-close the electromechanical valve if that is not so.

There is also provided a flammable fluid meter as described above, wherein the first communication interface is arranged to write the first internal control frame in a memory of the cut-off unit and to read an acknowledgement frame in the memory of the cut-off unit.

There is also provided a flammable fluid meter as described above, wherein the internal control frame includes a current value of an internal control frame counter that is incremented each time an internal control frame is transmitted by the flammable fluid meter to the cut-off unit.

There is also provided a flammable fluid meter as described above, further comprising authentication means arranged to authenticate the internal control frame.

There is also provided a flammable fluid meter as described above, wherein the authentication means are arranged to encrypt at least part of the internal control frame by using an encryption algorithm having a symmetrical encryption key that is stored both in a memory of the flammable fluid meter and also in a memory of the cut-off unit.

There is also provided a flammable fluid meter as described above, wherein the authentication means are arranged to decrypt the external control frame.

There is also provided a monitoring method for monitoring the temperature of a flammable fluid, the method being performed in a flammable fluid meter as described above and comprising the steps of:
- acquiring the temperature measurements produced by the temperature sensor;
- attempting to detect the occurrence of an anomaly relating to the temperature of the flammable fluid;

if the occurrence of an anomaly relating to the temperature of the flammable fluid is detected, producing an internal control frame incorporating a closing command for closing the electro-mechanical valve and transmitting said internal control frame to the second communication interface of the cut-off unit via the first communication interface in order to close the electro-mechanical valve.

There is also provided a computer program including instructions for causing the above-described flammable fluid meter to execute the steps of the above-described monitoring method.

There is also provided a computer readable storage medium, having stored thereon the computer program as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
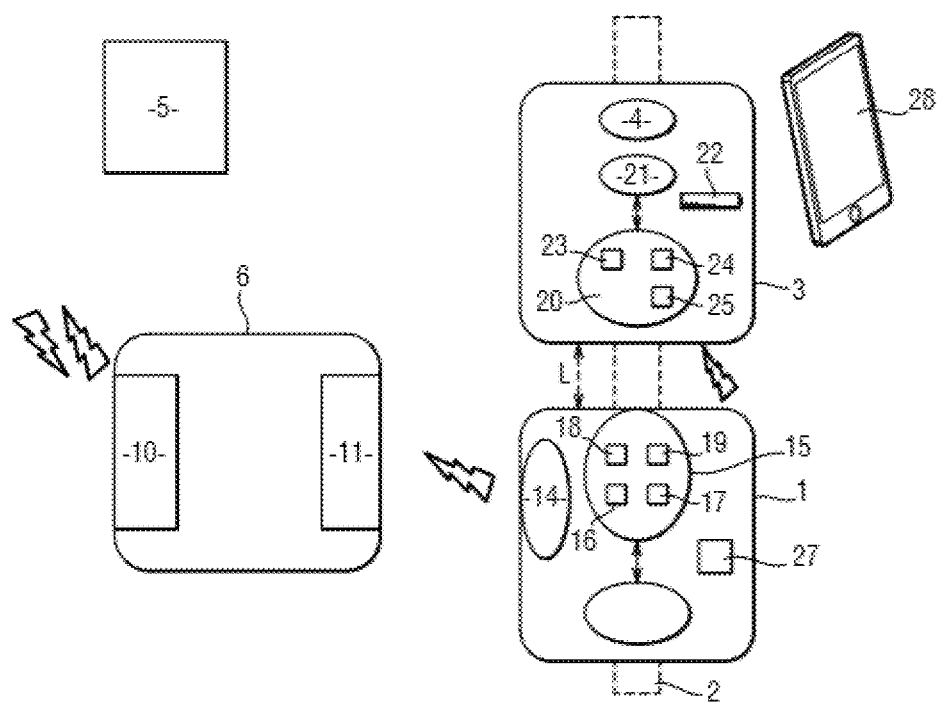
FIG. 1 shows an information system (IS), a data concentrator, a gas meter of the invention, a cut-off unit, and a mobile device.
Figure 2:
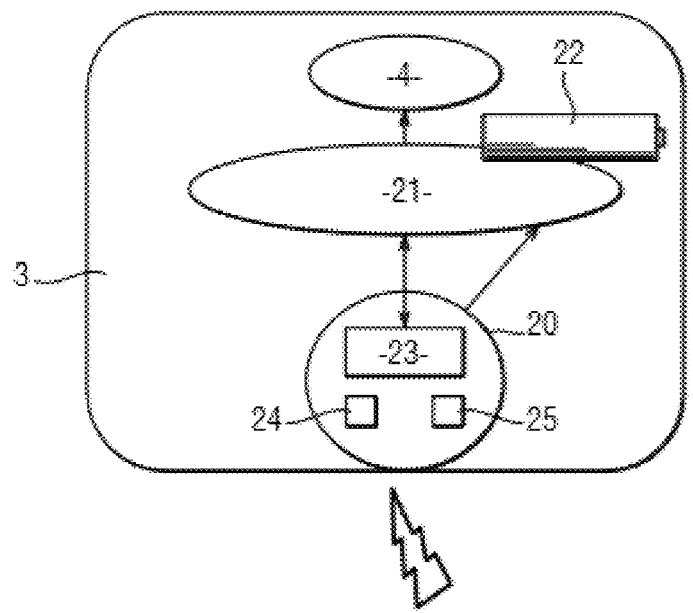
FIG. 2 shows the cut-off unit.

With reference to FIGS. 1 and 2, the inflammable fluid meter of the invention in this example comprises a gas meter 1 that is mounted on a pipe 2 of a natural gas distribution network and that is used for measuring the natural gas consumption of an installation.

A cut-off unit 3 is mounted on the pipe 2 in the proximity of the gas meter 1. The distance L between the gas meter 1 and the cut-off unit 3 may lie in the range 1 centimeter (cm) to 10 cm, for example. The cut-off unit 3 includes an electromechanical valve 4 that is used selectively to cut off or to re-establish the supply of gas to the installation.

In a nominal mode of operation, the commands for opening and closing the electromechanical valve 4 are issued by an information system (IS) 5, which transmits the opening or closing commands to the gas meter 1 via a data concentrator 6. The gas meter 1 relays these opening or closing commands to the cut-off unit 3.

Each of these entities is described briefly below.

The IS 5 comprises one or more servers and a communication module that enables it to communicate via a cellular network of 2G, 3G, or 4G type with data concentrators such as the data concentrator 6.

The data concentrator 6 comprises first communication means 10 for communicating with the IS 5 via a 2G, 3G, or 4G network, and second communication means 11 for communicating with the gas meter 1. The second communication means 11 enable the data concentrator 6 to communicate by radio communication, making use in this example of the Wize standard operating at the frequency of 169 megahertz (MHz).

The gas meter 1 is an ultrasonic meter. The gas meter 1 is a smart meter, and firstly it includes communication means 14 that are likewise adapted to communicate by radio communication using the Wize standard operating at the frequency of 169 MHZ. These communication means 14 enable the gas meter 1 to receive commands from the IS 5 via the data concentrator 6 for opening or closing the electromechanical valve 4

The gas meter 1 also includes a first communication interface 15, which in this example is a master near field communication (NFC) interface.

The first communication interface 15 firstly includes a processor module that comprises a first processor component. By way of example, the first processor component may be a processor, a microcontroller, or indeed a programmable logic circuit such as a field programmable gate array (FPGA) or an application-specific integrated circuit (ASIC). In this example, the first processor component is a first microcontroller 16. The first communication interface 15 also includes a first memory 17, an NFC transceiver 18, and a first antenna 19. In this example, the NFC transceiver 18 comprises an amplifier, a modulator, and a demodulator.

The gas meter 1 further includes authentication means that, in this example, comprise a programmed software module in the first microcontroller 16 and a zone of the first memory 17.

The gas meter 1 further comprises a temperature sensor 27 that measures the temperature of the gas in the gas meter 1. The first microcontroller 16 of the processor module acquires the temperature measurements produced by the temperature sensor 27. Naturally, where necessary, provision may be made for the processor module to include additional hardware and/or software components for formatting and acquiring the temperature measurements, for example an analog-to-digital converter and various compensation components.

In addition to the electromechanical valve 4, the cut-off unit 3 comprises a second communication interface 20, specifically a slave NFC interface, a second processor component, and a battery 22. By way of example, the second processor component may be a processor, a microcontroller, or indeed a programmable logic circuit such as an FPGA or an ASIC. Specifically, the second processor component is a second microcontroller 21.

The second communication interface 20 comprises a second memory 23, an NFC receiver 24, and a second antenna 25. By way of example, the NFC receiver 24 comprises a demodulator.

The second microcontroller 21 is arranged to act via a driver (not shown in figures) to command the electromechanical valve 4 to open or close. In this example, the second microcontroller 21 includes an inter-integrated circuit (I2C) interface for read and write accessing of the second memory 23.

The battery 22 of the cut-off unit 3 is used to power the second microcontroller 21 and the electromechanical valve 4 (together with the driver).

There follows a description of the way in which the gas meter 1 monitors the temperature of the gas.

As mentioned above, the gas meter includes a temperature sensor 27.

The temperature sensor 27 measures the temperature of the gas, and the first microcontroller 16 acquires the temperature measurements and attempts to detect the occurrence of an anomaly relating to the temperature of the gas.

The anomaly relating to the temperature of the gas may either be an abnormal temperature of the gas, or else an abnormal variation in the temperature of the gas.

In order to detect an abnormal temperature of the gas, the first microcontroller 16 compares the temperature of the gas with a predetermined temperature threshold, and when the temperature of the gas becomes higher than the predetermined temperature threshold, the first microcontroller 16 detects an abnormal temperature of the gas. The predetermined temperature threshold is a configurable threshold, typically equal to 120° C.

In order to detect an abnormal variation in the temperature of the gas, the first microcontroller 16 compares variation in the temperature of the gas with a (positive) predetermined variation threshold, and when the variation in the temperature of the gas is greater than the predetermined variation threshold for a predetermined duration, the first microcontroller 16 detects an abnormal variation in the temperature of the gas. The predetermined variation threshold is a configurable threshold, expressed in degrees Celsius per second, typically equal to 10° C./s. The predetermined duration is typically equal to 10 seconds (s).

Figure 3:
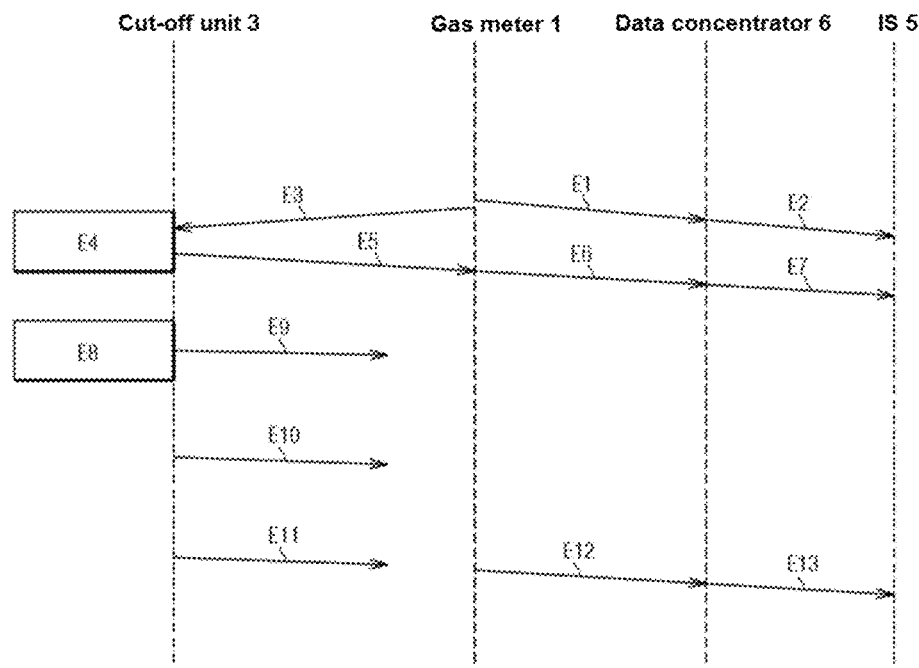
FIG. 3 shows exchanges of commands, of frames, and of messages between the entities of FIG. 1, in the event of the gas meter detecting the occurrence of an anomaly relating to temperature.

With reference to FIG. 3, when the gas meter 1 detects the occurrence of an anomaly relating to the temperature of the gas, the first microcontroller 16 of the gas meter 1 generates an alarm relating to the temperature of the gas intended for the IS 5. The alarm relating to the temperature of the gas is initially transmitted by the gas meter 1 to the data concentrator 6 by radio communication at 169 MHz (step E1), and it is then transmitted by the data concentrator 6 to the SI 5 via the 2G, 3G, or 4G network, using an http POST request and the TR-69 protocol (step E2).

Simultaneously, the first microcontroller 16 of the gas meter 1 produces an internal control frame that incorporates a command for closing the electromechanical valve 4 of the cut-off unit 3.

The internal control frame is authenticated by authentication means of the gas meter 1. Authentication consists in encrypting the control frame, at least in part.

The authentication means use an encryption algorithm having a "secret" symmetrical encryption key that is stored in the zone of the first memory 17 of the first communication interface 15.

The encryption algorithm is an advanced encryption standard (AES) algorithm using Galois counter mode (GCM). The encryption algorithm enables data to be encrypted and decrypted in 128-bit blocks. The symmetrical encryption key is a 128-bit key.

The symmetrical encryption key is also stored in a first zone of the second memory 23 of the second communication interface 20 of the cut-off unit 3, and is therefore known to the first communication interface 15 and to the second communication interface 20. The gas meter 1 and the cut-off unit 3 are associated via this same symmetrical encryption key. By way of example, once the gas meter 1 and the cut-off unit 3 have been manufactured, this association may be performed in the factory, by loading the symmetrical encryption key into the first memory 17 of the gas meter 1 and into the second memory 23 of the cut-off unit 3. This association may also be performed during installation on site.

The first microcontroller 16 transmits the internal control frame to the second communication interface 20 of the cut-off unit 3 via the first communication interface 15, and thus by using NFC technology, in order to close the electromechanical valve 4 (step E3).

By means of the NFC transceiver 18 and the first antenna 19, the first communication interface 15 produces, for this purpose, an electromagnetic field that induces electric current in the second antenna 25 of the second communication interface 20. The electromagnetic field serves to form a radio link enabling the first communication interface 15 to transmit the internal control frame to the second communication interface 20 and also to transmit electrical energy that powers the second communication interface 20. The second communication interface 20 is therefore not powered by the battery 22 of the cut-off unit 3, but only by the electrical energy transmitted via the radio link.

In order to optimize the transmission of electrical energy, it should be observed at this point that the first antenna 19 and the second antenna 25 are positioned facing each other with each extending in a plane perpendicular to the axis passing through their respective centers.

The first communication interface 15 then writes the internal control frame in a second zone of the second memory 23 of the second communication interface 20.

By default, the second microcontroller 21 of the cut-off unit 3 is generally to be found in a standby mode. When the second communication interface 20 receives the electrical energy transmitted by the first communication interface 15, it produces an activation signal that wakes up the second microcontroller 21.

The activation signal is an interrupt signal applied to a pin of the second microcontroller 21. In a variant, it would also be possible to use a "memory busy" type signal generated by the second communication interface 20 for the purpose of waking up the second microcontroller 21.

The second microcontroller 21 then accesses the internal control frame by reading in the second zone of the second memory 23. By knowing the symmetrical encryption key, the second microcontroller 21 decrypts the internal control frame, extracts the closing command from the internal control frame, and commands the electromechanical valve 4 to close.

Thereafter, after closing the electromechanical valve 4, the second microcontroller 21 writes an acknowledgement frame in a third zone of the second memory 23 of the second communication interface 20, the acknowledgement frame including an acknowledgement for the first communication interface 15 of the gas meter 1 (step E4). It should be observed that the third zone of the second memory 23 and the second zone of the second memory 23 could possibly, but need not necessarily, be the same zone.

The second microcontroller 21 authenticates the acknowledgement frame by using the above-mentioned encryption algorithm.

The first communication interface 15 of the gas meter 1 accesses the third zone of the second memory 23 of the second communication interface 20 in order to attempt to read an acknowledgement frame in the third zone of the second memory 23 (step E5). Reading is performed by a polling method: at regular intervals the first communication interface 15 accesses the content of the third zone of the second memory 23 in order to determine whether an acknowledgement frame is indeed to be found in the third zone of the second memory 23.

If the acknowledgement frame is indeed present on the first read attempt, the gas meter 1 itself returns an acknowledgement message to the data concentrator 6 (step E6). The data concentrator 6 relays the acknowledgement message to the IS 5 (step E7).

After the internal control frame has been transmitted to the cut-off unit 3, and if no acknowledgement frame is stored in the third zone of the second memory 23 (step E8), the first read attempt fails (step E9). The first communication interface 15 then makes a second read attempt (step E10). If this attempt fails, the first communication interface 15 makes a third read attempt (step E11). Each read attempt is spaced apart from the preceding read attempt by a predetermined duration, which is equal to 1 minute (min) in this example. After a predetermined number of unsuccessful read attempts, equal to 3 in this example, the gas meter 1 returns an error message to the data concentrator 6 (step E12). The data concentrator 6 relays the error message to the SI 5 and transmits an alert to inform of the SI 5 that the electro-mechanical valve 4 of the cut-off unit 3 has not been closed (step E13).

The first microcontroller 16 of the first communication interface 15 operates an internal control frame counter, and its current value is included in each internal control frame. The internal control frame counter is incremented by the first microcontroller 16 each time an internal control frame is transmitted by the gas meter 1 to the cut-off unit 3.

The internal control frame counter serves to avoid an internal control frame being "played back", i.e. to avoid an old internal control frame that has been received and acquired by an ill-intentioned person being used to produce an opening or closing command for fraudulently controlling the cut-off unit 3. Thus, when the second microcontroller 21 of the cut-off unit 3 acquires an internal control frame, it verifies that the current value of the internal control frame counter, as included in said internal control frame, is strictly greater than the value included in the preceding internal control frame.

Likewise, the second microcontroller 21 of the cut-off unit 3 operates an acknowledgement frame counter that is incremented each time the second an microcontroller 21 produces acknowledgement frame, with the current value of that counter being included in the acknowledgement frame.

Once the IS 5 has received the alarm relating to gas temperature, an operator comes to observe and solve the problem that caused the alarm.

Once there is no longer any risk, the operator acts locally to re-open the electromechanical valve 4. For this purpose, the operator is provided with a mobile device 28, e.g. a smartphone. The mobile device 28 has previously retrieved the symmetric encryption key that is in force by means of a key management system (KMS).

The mobile device 28 is brought into the proximity of the gas meter 1 and produces an external control frame incorporating a command to open the electromechanical valve 4. The external control frame is encrypted by the mobile device 28.

The external control frame is sent by NFC. The first microcontroller 16 of the gas meter 1 acquires the external control frame and decrypts it by knowing the symmetrical encryption key. The gas meter 1 also includes a wake-up system like that described above for the cut-off unit 3.

The first microcontroller 16 of the gas meter 1 then produces an internal control frame incorporating the opening command, and transmits said internal control frame to the second communication interface 20 of the cut-off unit 3 via the first communication interface 15 of the gas meter 1 in order to re-open the electro-mechanical valve 4.

Figure 4:
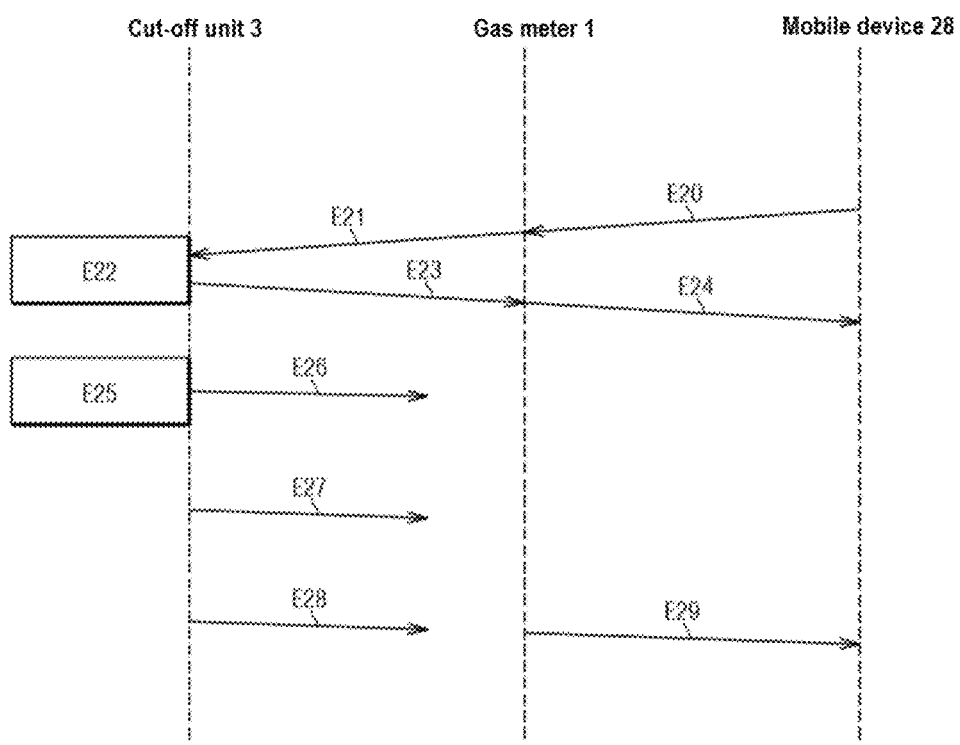
FIG. 4 shows exchanges of commands, of frames, and of messages between the entities of FIG. 1, in the event of the mobile device commanding the electromechanical valve to reopen.

This situation is shown in FIG. 4.

The operator takes the mobile device 28 into the proximity of the gas meter 1 and thus of the cut-off unit 3.

The mobile device 28 uses NFC to send the gas meter 1 an external control frame that incorporates a command to open the electromechanical valve 4 (step E20).

The first microcontroller 16 of the gas meter 1 acquires the external control frame and produces an internal control frame that incorporates the opening command. The internal control frame is authenticated by authentication means of the gas meter 1.

The gas meter 1 then transmits the internal control frame to the cut-off unit 3 by using NFC technology, in the same manner as described above (step E21-see step E3).

The second microcontroller 21 commands the electromechanical valve 4 to re-open.

Thereafter, once the electromechanical valve 4 has re-opened, the second microcontroller 21 produces and authenticates the acknowledgement frame, and then writes it in the second memory 23 (step E22).

The first communication interface 15 attempts to read an acknowledgement frame in the second memory 23 (step E23). Reading is performed using the above-described polling method.

If the acknowledgement frame is indeed present on the first read attempt, the gas meter 1 returns an acknowledgement message to the mobile device 28 (step E24).

After the internal control frame has been transmitted to the cut-off unit 3, and if no acknowledgement frame is stored in the third zone of the second memory 23 (step E25), the first read attempt fails (step E26). The first communication interface 15 then makes a second read attempt (step E27). If this attempt fails, the first communication interface 15 makes a third read attempt (step E28). Each read attempt is spaced apart from the preceding read attempt by a predetermined duration, which is equal to 1 min in this example. After a predetermined number of unsuccessful read attempts, equal to 3 in this example, the gas meter 1 returns an error message to the mobile device 28 (step E29).

It should be observed that, when the electromechanical valve 4 of the cut-off unit 3 reopens, the first microcontroller 16 of the gas meter 1 verifies two conditions.

Firstly, before re-opening the electromechanical valve 4, and thus before transmitting the internal control frame incorporating the opening command to the second interface 20 of the cut-off unit 3, the first microcontroller 16 of the gas meter 1 verifies that the temperature of the gas has returned to normal.

After the electromechanical valve 4 has re-opened, the first microcontroller 16 also verifies that the quantity of gas that is delivered during a (short) predetermined duration is less than or equal to a predetermined quantity threshold (e.g. expressed as a volume of gas). If it does not, the first microcontroller 16 re-closes the electromechanical valve 4. Specifically, since the electromechanical valve 4 was previously closed, the installation should not consume gas when the electromechanical valve 4 is re-opened, so the gas meter 1 should not observe any flow of gas when the electromechanical valve 4 re-opens, except in the event that there is a gas leak in the installation.

Figure 5:
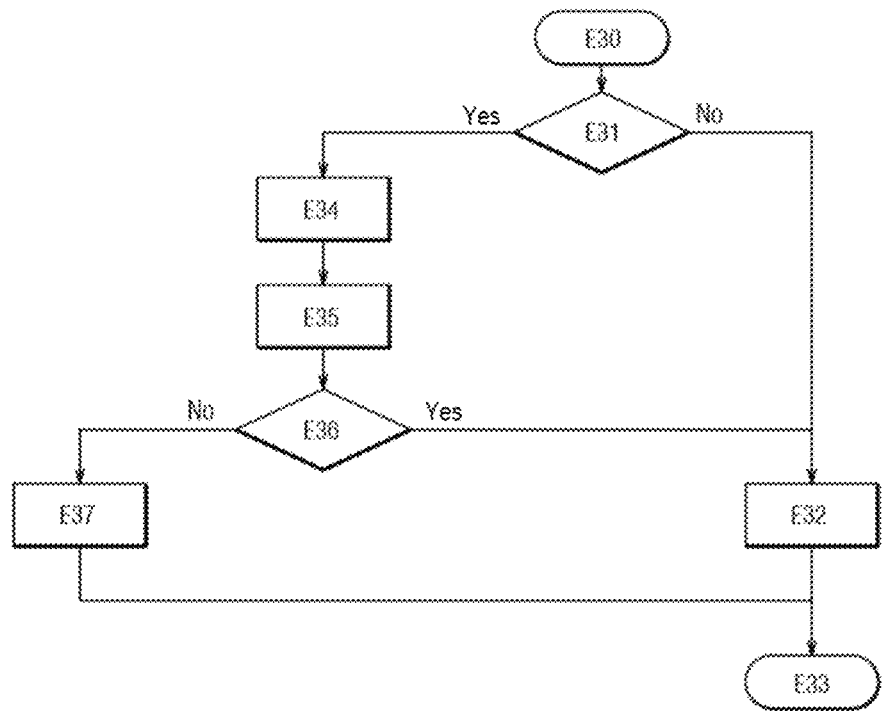
FIG. 5 shows verification steps performed by the gas meter when the electromechanical valve is reopened.

The steps of this verification method are shown in FIG. 5.

The verification method begins with step E30.

The first microcontroller 16 of the gas meter 1 analyzes the temperature measurements, and verifies that the anomaly relating to the temperature of the gas has indeed disappeared (step E31).

If it has not, and thus if an anomaly is still present, the gas meter 1 sends an alert to the mobile device 28 (step E32). The verification method comes to an end (step E33).

If the anomaly has indeed disappeared, the first microcontroller 16 acquires and stores a first measurement index associated with the present time T0, and then transmits the internal control frame incorporating the opening command in order to open the electromechanical valve 4 (step E34). The first measurement index is representative of the quantity of gas distributed by the pipe 2 up to the present time T0. The first microcontroller 16 waits for a duration equal to a predetermined duration, in this example 5 s (E35), and then acquires a second measurement index associated with the time T0+5 seconds. In this example, the indices are volumes expressed in liters.

The first microcontroller 16 verifies whether the difference between the second index and the first index is strictly greater than (or equal to) a predetermined quantity threshold, e.g. specifically equal to 1 liter (step E36).

If the difference between the second index and the first index is strictly greater than the predetermined quantity threshold, then the gas meter 1 sends an alert to the mobile device 28 (step E32). The verification method comes to an end (step E33).

Otherwise, the gas meter 1 sends a re-opening agreement message to the mobile device 28 (step E37). The verification method comes to an end (step E33).

Figure 6:
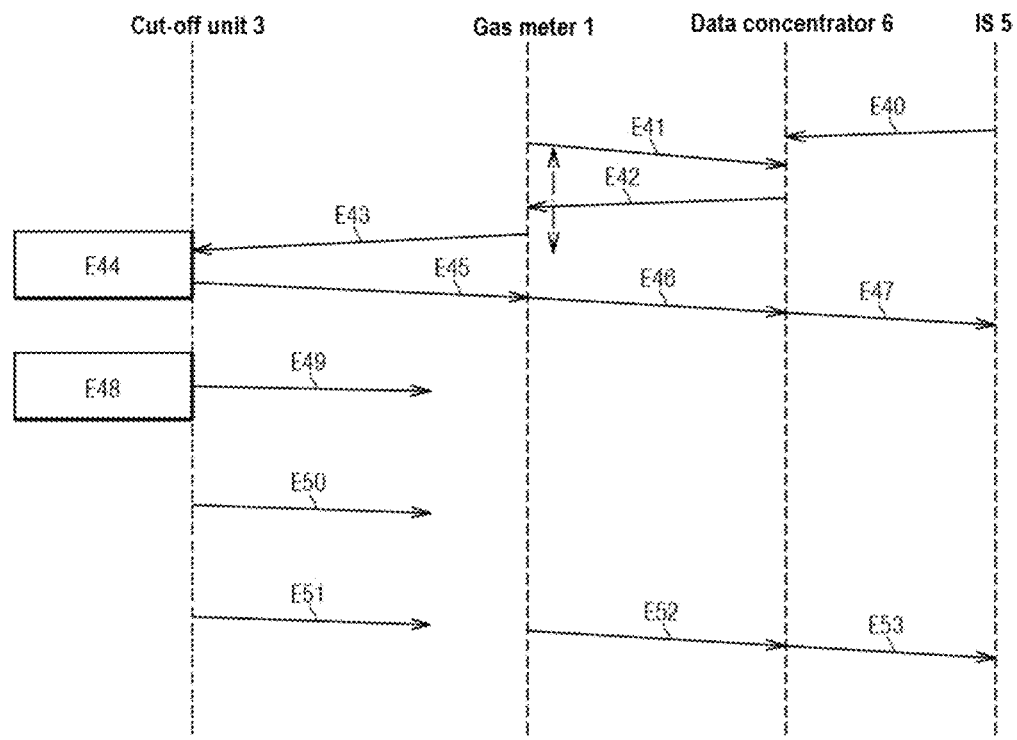
FIG. 6 is a figure similar to FIGS. 3 and 4, in the event of the IS commanding the electromechanical valve to reopen.

Alternatively, and with reference to FIG. 6, the IS 5 can perfectly well act via the data concentrator 6 and the gas meter 1 to command re-opening of the electromechanical valve 4.

The IS 5 produces a command for opening the electromechanical valve 4 of the cut-off unit 3, and transmits the opening command to the data concentrator 6 by using an http POST request of the TR-69 protocol (step E40).

At regular intervals, the gas meter 1 sends a collect frame to the data concentrator 6 (step E41).

The data concentrator 6 waits to receive the collect frame, and when it does receive the collect frame, the data concentrator 6 sends the opening command in the listening window of the gas meter 1 (step E42). For this purpose, the data concentrator 6 uses radio communication using the Wize standard operating at the frequency of 169 MHZ.

The first microcontroller 16 of the gas meter 1 produces an internal control frame that incorporates a command for opening the electromechanical valve 4 of the cut-off unit 3.

The internal control frame is authenticated by authentication means of the gas meter 1.

The gas meter 1 then transmits the internal control frame to the cut-off unit 3 by using NFC technology, in the same manner as described above (step E43).

The second microcontroller 21 commands the electromechanical valve 4 to open.

Thereafter, once the electromechanical valve 4 has opened, the second microcontroller 21 produces and authenticates the acknowledgement frame, and then writes it in the second memory 23 (step E44).

The first communication interface 15 attempts to read an acknowledgement frame in the second memory 23 (step E45). Reading is performed using the above-described polling method.

If the acknowledgement frame is indeed present on the first read attempt, the gas meter 1 returns an acknowledgement message to the data concentrator 6 (step E46) which returns it to the IS 5 (step E47).

After the internal control frame has been transmitted to the cut-off unit 3, and if no acknowledgement frame is stored in the third zone of the second memory 23 (step E48), the first read attempt fails (step E49). The first communication interface 15 then makes a second read attempt (step E50). If this attempt fails, the first communication interface 15 makes a third read attempt (step E51). Each read attempt is spaced apart from the preceding read attempt by a predetermined duration, which is equal to 1 min in this example. After a predetermined number of unsuccessful read attempts, equal to 3 in this example, the gas meter 1 returns an error message to the data concentrator 6 (step E52), which returns it to the IS 5 (E53).

It should be observed that FIG. 6 also corresponds to "nominal" operation of the system: when no anomaly relating to the temperature of the gas is detected, it is the IS 5 that produces the opening or closing commands for actuating the electro-mechanical valve 4 of the cut-off unit 3.

There follows a more detailed description of the structure of an internal control frame (as produced by the gas meter 1 for the cut-off unit 3), of an acknowledgement frame (as produced by the cut-off unit 3 for the gas meter 1), and of an external control frame (as produced by the mobile device 28 for the gas meter 1).

Figure 7:
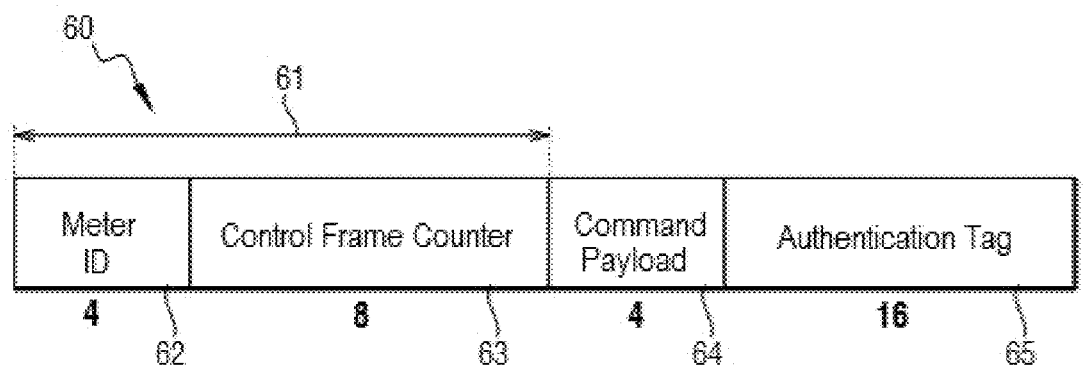
FIG. 7 shows an internal control frame.

With reference to FIG. 7, an internal control frame 60 comprises firstly an initial value IV 61 that is not encrypted and that complies with the recommendation of NIST special publication 800-38, chapter 8.2.1.

The initial value IV 61 is subdivided into a first field 62 and a second field 63.

The first field 62 is a 4-byte field that contains an identifier of the issuer of the message, specifically an identifier of the gas meter 1.

The second field 63 is an 8-byte field that contains the current value of the internal control frame counter. The second field 63 allows for more than $18 \times 10^{18}$ commands without changing the symmetrical encryption key, and it is reinitialized to 0 each time the symmetrical key is changed.

Thereafter, the internal control frame 60 comprises a payload 64, which is a functional field for identifying the function of the frame: opening command, closing command, or acknowledgement. The payload 64 is encrypted by the AES encryption algorithm using the GCM mode of operation, and it comprises 4 bytes.

The payload 64 has one control byte that takes the following values:
- '0': for a command to open the electromechanical valve 4. This is an internal control frame coming from the gas meter 1;
- '1': for a command to close the electromechanical valve 4. This is an internal control frame coming from the gas meter 1; or
- '2': for an acknowledgement. This is an acknowledgement frame coming from the cut-off unit 3.

The control byte in the payload 64 of the internal control frame 60 thus has the value '0' for an opening command and the value '1' for a closing command.

The payload 64 also has 3 bytes that are not used.

It should be observed that the encryption algorithm used generates a 16-byte random number from the command byte.

The internal control frame 60 then has a 16-byte message authentication code 65 (also known as a "tag") that is generated by the AES encryption algorithm using the GCM mode of operation. The message authentication code 65 serves to authenticate the internal control frame 60, to ensure the integrity of the data that it contains, and to confirm that the internal control frame 60 does indeed come from an expected issuer (specifically the gas meter 1).

Figure 8:
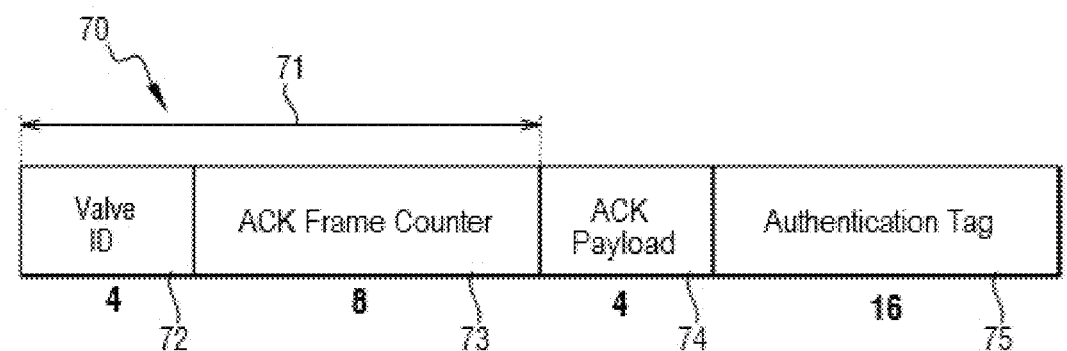
FIG. 8 shows an acknowledgement frame.

With reference to FIG. 8, an acknowledgement frame 70 comprises firstly an initial value IV 71 subdivided into a first field 72 and a second field 73.

The first field 72 is a 4-byte field that contains an identifier of the issuer of the message, specifically an identifier of the cut-off unit 3.

The second field 73 is an 8-byte field that contains the current value of the acknowledgement frame counter. The second field 73 allows for more than $18 \times 10^{18}$ acknowledgements without changing the symmetrical encryption key, and it is reinitialized to 0 each time the symmetrical key is changed.

Thereafter, the acknowledgement frame 70 comprises a payload 74 encrypted by the AES encryption algorithm using the GCM mode of operation, and occupying 4 bytes.

The command byte of the payload 74 of the acknowledgement frame 70 has the value '2'.

The payload 74 also has 3 bytes that are not used.

It should be observed that the encryption algorithm used generates a 16-byte random number from the command byte.

The acknowledgement frame 70 then has a 16-byte message authentication code 75 (also known as a "tag") that is generated by the AES encryption algorithm using the GCM mode of operation. The message authentication code 75 serves to authenticate the acknowledgement frame 70, to ensure the integrity of the data that it contains, and to confirm that the acknowledgement frame 70 does indeed come from an expected issuer (specifically the cut-off unit 3).

Figure 9:
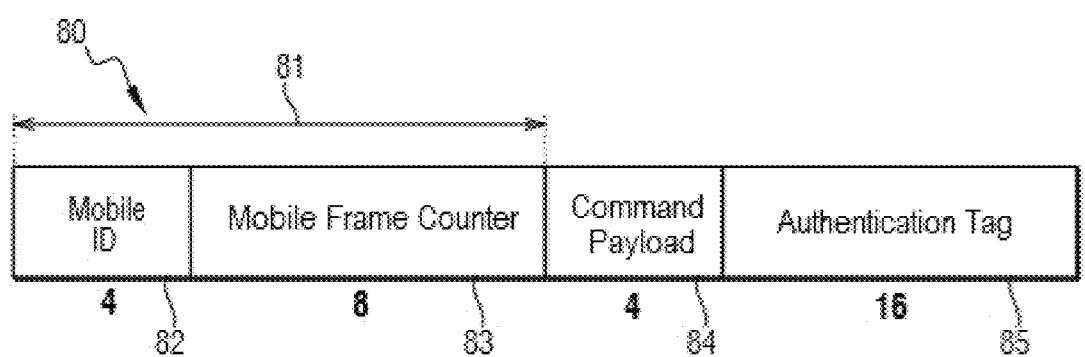
FIG. 9 shows an external control frame.

With reference to FIG. 9, an external control frame 80 comprises firstly an initial value IV 81 that is not encrypted and that complies with the recommendation of NIST special publication 800-38, chapter 8.2.1.

The initial value IV 81 is subdivided into a first field 82 and a second field 83.

The first field 82 is a 4-byte field that contains an identifier of the issuer of the message. In this example, a single constant identifier is selected for all of the mobile devices.

The second field 83 is an 8-byte field that contains the current value of the external control frame counter. The second field 83 allows for more than $18 \times 10^{18}$ commands without changing the symmetrical encryption key, and it is reinitialized to 0 each time the symmetrical key is changed.

Thereafter, the external control frame 80 comprises a payload 84, which is a functional field for identifying the function of the frame: opening command, closing command, or acknowledgement. The payload 84 is encrypted by the AES encryption algorithm using the GCM mode of operation, and it comprises 4 bytes.

The payload 84 has one control byte that takes the following values:

'0': for a command to open the electromechanical valve 4;

'1': for a command to close the electromechanical valve.

The command byte in the payload 84 of the external control frame 80 thus has the value 'O' for an opening command and the value '1' for a closing command.

The payload 84 also has 3 bytes that are not used.

The external control frame 80 then has a 16-byte message authentication code 85 (also known as a "tag") that is generated by the AES encryption algorithm using the GCM mode of operation. The message authentication code 85 serves to authenticate the control frame 80, to ensure the integrity of the data that it contains, and to confirm that the control frame 80 does indeed come from an expected issuer (specifically a mobile device provided for this purpose).

Naturally, the invention is not limited to the embodiment described, but covers any variant coming within the ambit of the invention as defined by the claims.

The communication technologies and protocols serving to interconnect the IS, the data concentrator, the fluid meter, the cut-off unit, and the mobile device could be different from those described above.

The first communication and interface the second communication interface need not necessarily be NFC interfaces. A technology or a protocol of some other type could be used, and for example a so-called "proprietary" technology and protocol. Any radio link that makes it possible to transmit both data (commands, acknowledgements, etc.) and also sufficient electrical energy to power a communication interface comes within the ambit of the invention.

The invention may naturally be performed in a meter used in a network for distributing a flammable fluid other than natural gas: some other flammable gas, oil, etc.

Other encryption algorithms could be used, and for example the Twofish, Serpent, and/or Blowfish algorithms. More generally, the authentication means could be different from those described above. It is possible to use any authentication means capable of certifying the authenticity of a frame.

The invention claimed is:

1. A flammable fluid meter, comprising:
a first communication interface arranged both to communicate via a radio link with a second communication interface of a cut-off unit including an electromechanical valve, and also to transmit electrical energy via the radio link, the electrical energy being adapted to power the second communication interface of the cut-off unit;
a temperature sensor arranged in the flammable fluid meter to measure a temperature of the flammable fluid which is in the flammable fluid meter; and
a processor module arranged to acquire temperature measurements produced by the temperature sensor, to attempt to detect an occurrence of an anomaly relating to the temperature of the flammable fluid, and if an anomaly relating to the temperature of the flammable fluid is detected, to produce an internal control frame incorporating a closing command for closing the electromechanical valve and to transmit said internal control frame to the second communication interface of the cut-off unit via the first communication interface in order to close the electromechanical valve.

2. The flammable fluid meter according to claim 1, wherein the processor module is arranged to detect the occurrence of an anomaly relating to the temperature of the flammable fluid when the temperature of the flammable fluid is greater than a predetermined temperature threshold, or when a variation in the temperature of the flammable fluid is greater than a predetermined variation threshold.

3. The flammable fluid meter according to claim 1, wherein following detection of an anomaly relating to the temperature of the flammable fluid and following closure of the electromechanical valve, the processor module is arranged to act via the first communication interface to acquire an external control frame incorporating an opening command and transmitted by a mobile device brought into a proximity of the flammable fluid meter, and to produce an internal control frame incorporating the opening command and to transmit said internal control frame to the second communication interface of the cut-off unit via the first communication interface in order to re-open the electromechanical valve.

4. The flammable fluid meter according to claim 3, wherein the processor module is arranged to verify that the temperature of the flammable fluid has returned below a predetermined temperature threshold before re-opening the electromechanical valve.

5. The flammable fluid meter according to claim 4, wherein, after re-opening of the electromechanical valve, the processor module is arranged to verify that a quantity of flammable fluid distributed during a predetermined duration is less than or equal to a predetermined quantity threshold, and to re-close the electromechanical valve if that is not so.

6. The flammable fluid meter according to claim 3, further comprising authentication means arranged to decrypt the external control frame.

7. The flammable fluid meter according to claim 1, wherein the first communication interface is arranged to write the internal control frame in a memory of the cut-off unit and to read an acknowledgement frame in the memory of the cut-off unit.

8. The flammable fluid meter according to claim 1, wherein the internal control frame includes a current value of an internal control frame counter that is incremented each time an internal control frame is transmitted by the flammable fluid meter to the cut-off unit.

9. The flammable fluid meter according to claim 1, further comprising authentication means arranged to authenticate the internal control frame.

10. The flammable fluid meter according to claim 9, wherein the authentication means are arranged to encrypt at least part of the internal control frame by using an encryption algorithm having a symmetrical encryption key that is stored both in a memory of the flammable fluid meter and also in a memory of the cut-off unit.

11. A monitoring method for monitoring the temperature of a flammable fluid, the method being performed in a flammable fluid meter according to claim 1, and comprising the steps of:
  acquiring the temperature measurements produced by the temperature sensor;
  attempting to detect the occurrence of an anomaly relating to the temperature of the flammable fluid; and
  if the occurrence of an anomaly relating to the temperature of the flammable fluid is detected, producing the internal control frame incorporating a closing command for closing the electromechanical valve and transmitting said internal control frame to the second communication interface of the cut-off unit via the first communication interface in order to close the electromechanical valve.

12. A non-transitory computer readable storage medium having stored thereon a computer program including instructions for causing the flammable fluid meter according to claim 1 to execute a monitoring method for monitoring the temperature of a flammable fluid, the method being performed in the flammable fluid meter, and comprising the steps of:
  acquiring the temperature measurements produced by the temperature sensor;
  attempting to detect the occurrence of an anomaly relating to the temperature of the flammable fluid;
  if the occurrence of an anomaly relating to the temperature of the flammable fluid is detected, producing the internal control frame incorporating a closing command for closing the electromechanical valve and transmitting said internal control frame to the second communication interface of the cut-off unit via the first communication interface in order to close the electromechanical valve.

13. A flammable fluid meter, comprising:
  a first communication interface arranged both to communicate via a radio link with a second communication interface of a cut-off unit including an electromechanical valve, and also to transmit electrical energy via the radio link, the electrical energy being adapted to power the second communication interface of the cut-off unit;
  a temperature sensor arranged in the flammable fluid meter to measure a temperature of the flammable fluid which is in the flammable fluid meter; and
  a processor module arranged to acquire temperature measurements produced by the temperature sensor, to attempt to detect an occurrence of an anomaly relating to the temperature of the flammable fluid, and if an anomaly relating to the temperature of the flammable fluid is detected, to produce an internal control frame incorporating a closing command for closing the electromechanical valve and to transmit said internal control frame to the second communication interface of the cut-off unit via the first communication interface in order to close the electromechanical valve;
  the flammable fluid meter further comprising authentication means arranged to authenticate the internal control frame, the authentication means being arranged to encrypt at least part of the internal control frame by using an encryption algorithm having a symmetrical encryption key that is stored both in a memory of the flammable fluid meter and also in a memory of the cut-off unit; and
  wherein said encryption algorithm is an advanced encryption standard algorithm.

14. A flammable fluid meter according to claim 13, wherein said advanced encryption standard algorithm uses Galois counter mode.

* * * * *